(12) United States Patent
Lumaca et al.

(10) Patent No.: US 10,906,671 B2
(45) Date of Patent: Feb. 2, 2021

(54) MODULAR ARCHITECTURE OPTIMIZED FOR MAKING MICROSATELLITES

(71) Applicant: Thales Alenia Space Italia S.p.A. Con Unico Socio, Rome (IT)

(72) Inventors: Francesco Lumaca, Rome (IT); Giuseppe Oronzo, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 231 days.

(21) Appl. No.: 15/536,024

(22) PCT Filed: Dec. 11, 2015

(86) PCT No.: PCT/IB2015/059556
§ 371 (c)(1),
(2) Date: Jun. 14, 2017

(87) PCT Pub. No.: WO2016/097955
PCT Pub. Date: Jun. 23, 2016

(65) Prior Publication Data
US 2017/0361948 A1     Dec. 21, 2017

(30) Foreign Application Priority Data
Dec. 15, 2014   (IT) .......................... TO2014A001042

(51) Int. Cl.
*B64G 1/10*     (2006.01)

(52) U.S. Cl.
CPC ........ *B64G 1/10* (2013.01); *B64G 2001/1092* (2013.01)

(58) Field of Classification Search
CPC .......................... B64G 1/10; B64G 2001/1092
See application file for complete search history.

(56) References Cited

U.S. PATENT DOCUMENTS

| 6,206,327 B1 | 3/2001 | Benedetti et al. |
| 6,260,804 B1 * | 7/2001 | Anderson ............ B64G 1/1007 244/159.4 |

(Continued)

FOREIGN PATENT DOCUMENTS

| CN | 102975867 | 12/2014 |
| CN | 103612775 | 1/2016 |

(Continued)

OTHER PUBLICATIONS

Maly et al., ESPA Satellite Dispenser for ORBCOMM Generation 2, 2013, 27th Annual AIAA/USU Conference on Small Satellites, pp. 1-7 (Year: 2013).*

(Continued)

*Primary Examiner* — Livius R. Cazan
(74) *Attorney, Agent, or Firm* — McCarter & English, LLP

(57) ABSTRACT

The present invention concerns a method for making a microsatellite, comprising providing: modules of a first type configured to house electronic boards of a microsatellite; modules of a second type configured to house devices and systems of a microsatellite; and modules of a third type comprising first and second interface means configured to be coupled to a launch vehicle and to external appendages of a microsatellite, respectively; said modules of a third type being designed to cause a body of a microsatellite to have a predefined height; wherein all the modules of the first, second and third types are configured to be stacked regardless of the type. The method further comprises making a body of a microsatellite by stacking modules of different types, wherein the stacked modules include at least one module of the second type and at least one module of the third type.

20 Claims, 6 Drawing Sheets

(56) References Cited

U.S. PATENT DOCUMENTS

2007/0029446 A1  2/2007  Mosher et al.
2013/0099059 A1  4/2013  De Beaupre

FOREIGN PATENT DOCUMENTS

CN        103562069        3/2016
RU        2338233 C2      11/2008
WO   WO 2010/068174 A1   6/2020

OTHER PUBLICATIONS

PCT International Search Report and Written Opinion for PCT/IB2015/059556 dated Feb. 29, 2016.
English translation of Notice for Reasons of Refusal dated Sep. 17, 2019 for Japanese Patent Application No. 2017-531554.
Indian Office Action dated Feb. 20, 2020 for Indian Patent Application No. 201727020333.
Israeli Office Action dated Oct. 11, 2020, in Israeli patent application No. 252724 D0.

\* cited by examiner

MODULAR ARCHITECTURE OPTIMIZED FOR MAKING MICROSATELLITES

This application is a 35 U.S.C. § 371 National Stage filing of International Application No. PCT/IB2015/059556 filed on Dec. 11, 2015, which claims priority to Italian Patent Application TO2014A001042 filed on Dec. 15, 2014.

TECHNICAL FIELD OF THE INVENTION

The present invention concerns, in general, a modular architecture optimized for making microsatellites and, in particular, a method and a system for making microsatellites based on said modular architecture.

STATE OF THE ART

As is known, the average time needed to build a satellite today, even using consolidated technologies, is still at least 24-30 months. These time scales are considered adequate for strategic space missions, but are evidently too long for missions that cannot be planned a long time in advance, such as, for example, space missions intended for tactical military operations or for short-notice monitoring requirements.

In fact, in general each satellite is usually designed expressly for the specific mission to which it is destined, in this way representing an optimal solution for that mission, but at the same time a solution rigidly tied to that mission.

In particular, at the moment, for each new mission it is necessary to almost entirely repeat the design, development and testing of the satellite or satellites destined to that mission, as well as the electronic, mechanical and other systems installed on board the satellite(s), as pre-existing solutions are difficult to reuse and, even when they can be reused, still require modifications and, consequently, also new tests.

All of this entails extremely high costs and very long time scales to reach the end of the process, namely launching the satellites in orbit.

In recent years, technological developments have enables making ever smaller satellites, in terms of mass and size, capable of performing an increasing number of functions. In general, a satellite of small mass and size provides a series of advantages with respect to traditional "larger" satellites, in particular basically entailing lower costs and manufacturing times. Therefore, satellites of small mass and size, such as the so-called microsatellites for example, are increasingly used for space missions that have a limited mission budget and/or cannot be planned well in advance (for example, because they are set up to respond to sudden needs that could not be foreseen).

Unfortunately, however, at present even these satellites of small mass and size, such as the so-called microsatellites for example, continue to be made with the above-mentioned traditional design, development and testing approach used for the traditional "larger" satellites. As is easy to guess, this approach does not allow reducing manufacturing times and costs beyond a certain limit, hence effectively limiting the use this type of satellite.

Thus, today in the space/satellite industry there is an increasingly felt need to further reduce the manufacturing times and costs of satellites of small mass and size, in particular of microsatellites, in order to respond to the increasingly pressing demands of the reference market.

One potential solution to this need is provided in US 2007/0029446 A1, which describes a method for implementing a modular platform for the construction of satellites and other space platforms.

In particular, the method described in US 2007/0029446 A1 comprises:
identifying a plurality of functional elements and their associated functional routines potentially usable on board a satellite;
associating the functional routines with one another in a strategic manner;
dividing the functional routines to define a plurality of subsystems; and
deriving a plurality of modules from the plurality of subsystems, each of the modules being configured to operably interface with at least one other module to construct a working satellite capable of carrying out a predetermined number of said functional routines.

In other words, in order to provide a solution to the above-mentioned need for reducing the manufacturing times and costs of a satellite, US 2007/0029446 A1 proposes the use of a modular architecture. Unfortunately, however, the above-mentioned solution described in US 2007/0029446 A1 is so generic and abstract that, to all intents and purposes, it cannot actually be applied and used by an operator in the space/satellite industry, such as the applicant, in order to effectively reduce the manufacturing times and costs of a satellite, in particular a microsatellite.

OBJECT AND SUMMARY OF THE INVENTION

As is known, the term "microsatellite" is generally used to indicate an artificial satellite with a mass of 10 to 100 kg. However, this is not an official convention and sometimes the term microsatellite is also used to indicate satellites with a mass less than 10 kg or greater than 100 kg. Therefore, for the sake of clarity, it is wished to specify here that in the following description and definition of the invention forming the subject of the present patent application, the term microsatellite will be used to indicate an artificial satellite with a mass of less than, or at most equal to, 150 kg.

The applicant has carried out in-depth research in order to successfully develop a solution to the above-mentioned need for reducing the manufacturing times and costs of microsatellites. Thanks to this in-depth research, the applicant has developed the present invention, which relates to a modular architecture optimized for making microsatellites that, unlike the generic and abstract solution described in US 2007/0029446 A1, is truly applicable and usable, and enables effectively reducing the manufacturing times and costs of a microsatellite.

Therefore, object of the present invention is to provide a solution to the above-mentioned need for reducing the manufacturing times and costs of microsatellites.

This and other objects of the present invention are achieved in so far as it relates to a method and a modular system for making a microsatellite, as defined in the appended claims.

In particular, the method for making a microsatellite according to the present invention comprises providing:
modules of a first type configured to house electronic boards of a microsatellite;
modules of a second type configured to house devices and systems of a microsatellite; and
modules of a third type, which
comprise first interface means configured to be coupled to a launch vehicle,
comprise second interface means configured to be coupled to external appendages of a microsatellite, and are designed to cause a body of a microsatellite to have a predefined height;

wherein all the modules of the first, second and third types are configured to be stacked regardless of the type.

Said method further comprises making a body of a microsatellite by stacking modules of different types, wherein the stacked modules include at least one module of the second type and at least one module of the third type.

Preferably, said stacked modules also include at least one module of the first type.

Conveniently, making a body of a microsatellite comprises performing the following operations:

providing electronic boards, devices and systems designed to be installed on board a microsatellite and, when installed on board a microsatellite, cause the latter to become configured to carry out a predefined mission;

housing said electronic boards in one or more of said modules of the first type, thereby obtaining one or more corresponding first modules to be used to make the body of the microsatellite;

housing said devices and said systems in one or more of said modules of the second type, thereby obtaining one or more corresponding second modules to be used to make the body of the microsatellite;

providing a stacking order of said first and second modules, inserting in said stacking order also one or more of said modules of the third type, thereby obtaining one or more corresponding third modules to be used to make the body of the microsatellite, wherein each third module is inserted in said stacking order to carry out at least one of the following functions:

causing the body of the microsatellite to have a predefined height, spacing apart two modules intended, according to said stacking order, to be stacked immediately above and below said third module, increasing a housing volume of a second module intended, according to said stacking order, to be stacked immediately below said third module, increasing disposal of internal heat of a first or second module intended, according to said stacking order, to be stacked immediately below said third module, providing interface points for coupling the body of the microsatellite to external appendages and/or to a launch vehicle; and making the body of the microsatellite by stacking said first, second and third modules according to said stacking order.

Conveniently, said method further comprises coupling the body of the microsatellite to external appendages by coupling the latter to the second interface means of at least one stacked module of the third type. More conveniently, said external appendages coupled to the body of the microsatellite comprise at least one of the following elements: one or more solar panels, one or more sensors, one or more antennas, and one or more remote sensing systems.

Preferably, the body of the microsatellite includes at least two modules of the third type arranged in predefined positions and said method further comprises coupling the first interface means of said at least two modules of the third type arranged in said predefined positions to further interface means designed to couple said microsatellite to a launch vehicle operating in dispenser mode. Alternatively, the body of the microsatellite terminates at the bottom with a module of the third type, which is coupled at the bottom to an interface structure, which is configured to be coupled to a ring-shaped adapter for a launch vehicle.

Conveniently, all the modules of the first, second and third types have one and the same base size, one and the same base shape and the same mechanical coupling points, thereby being configured to be stacked regardless of the type.

Preferably, all the modules of the first type have one and the same first height, all the modules of the second type have one and the same second height and all the modules of the third type have one and the same third height; and wherein the first height is greater than the third height and the second height is greater than the first height. Conveniently, said first height is such that to guarantee that internal temperature of the modules of the first type does not exceed a predefined maximum temperature.

BRIEF DESCRIPTION OF THE DRAWINGS

For a better understanding of the present invention, some preferred embodiments, provided by way of non-limitative example, will now be described with reference to the accompanying drawings (not to scale), in which.

DETAILED DESCRIPTION OF PREFERRED EMBODIMENTS OF THE INVENTION

Figure 1:
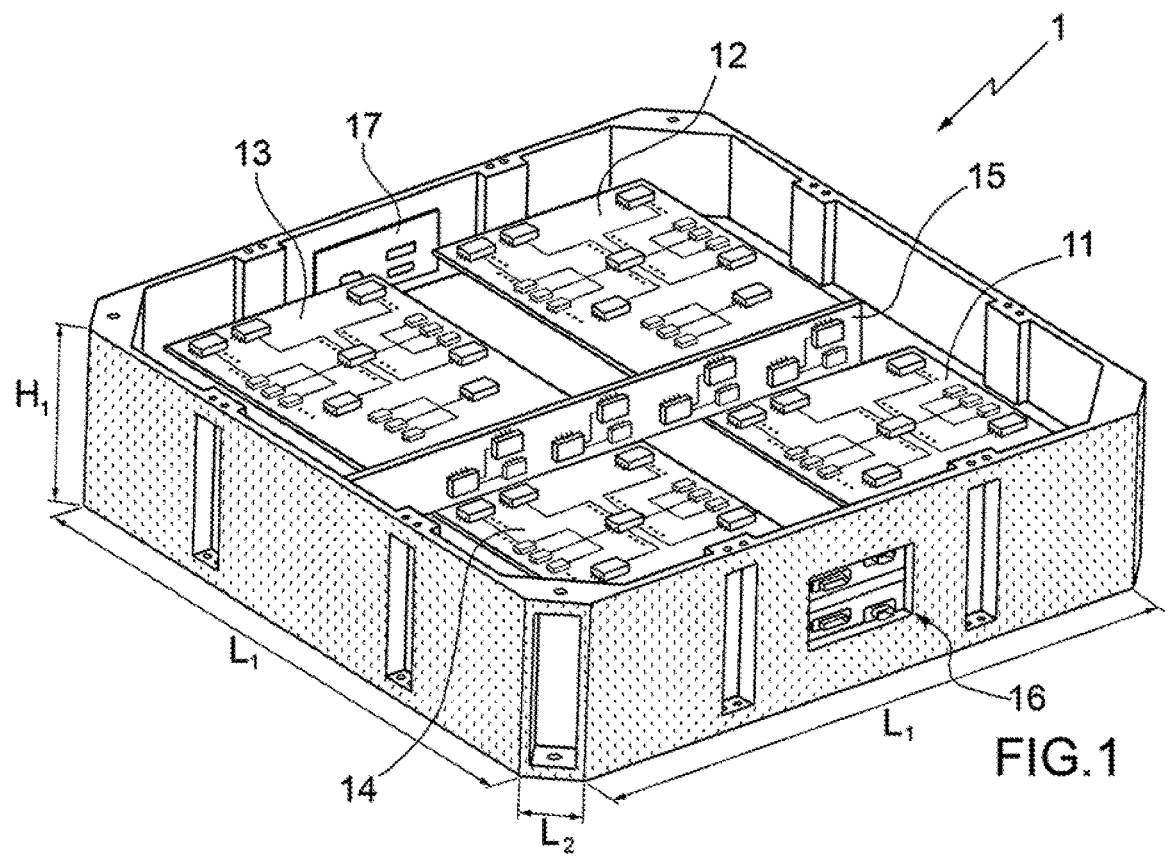
FIGS. 1, 2 and 3 respectively show modules of a first, second and third type according to a preferred embodiment of the present invention.

The following description is provided to enable an expert in the field to embody and use the invention. Various modifications to the embodiments shown will be immediately obvious to experts and the generic principles described herein could be applied to other embodiments and applications without departing from the scope of protection of the present invention as defined in the appended claims.

Thus, the present invention is not intended to be limited to the embodiments set forth herein, but is to be accorded the widest scope consistent with the principles and features disclosed herein and defined in the appended claims.

The present invention concerns a modular architecture optimized for making microsatellites. In particular, the modular architecture according to the present invention enables making the body of a microsatellite by stacking standard modules that can belong to three different types according to the specific function performed, namely:

a first type of modules, which are referred to by the applicant as electronic functional trays (EFTs) and are configured to house electronic elements that are highly dissipative (i.e., which generate large amounts of heat)

and are substantially two-dimensional (2D), namely electronic boards in general, and printed circuit boards (PCBs) in particular;

a second type of modules, which are referred to by the applicant as volumetric functional trays (VFTs) and are configured to house three-dimensional (3D) devices and systems of various shapes and sizes that need to be installed on board a microsatellite, such as, for example, avionics actuators (reaction wheels, attitude control gyroscopes, etc.), propulsion elements (tanks, pipelines, valves, etc.), batteries, etc.; and a third type of modules, which are referred to by the applicant as geometric functional trays (GFTs) and designed to perform one or more of the following functions:

causing the body of the microsatellite to have a predefined height, and/or spacing apart two modules of the first and/or second type stacked immediately above and below, and/or increasing the housing volume of a module of the second type stacked immediately below, and/or increasing the radiant surfaces of a module of the first or second type stacked immediately below in order to increase the external dissipation, or disposal, of heat generated by the elements arranged inside said module of the first or second type, and/or providing interface points for coupling the body of the microsatellite to a launch vehicle (or launcher) and/or to external appendages (such as solar panels for example) and/or to payload items (such as synthetic aperture radar (SAR) antennas/devices/systems, telecommunications antennas/devices/systems, optical remote sensing antennas/devices/systems, sensors, etc.).

In detail, all the modules of all three types are internally hollow, have a right prism shape and have the same basic shape and same basic size so as allow the modules to be stacked regardless of the type.

Conveniently, the modules of the first and second type can be provided with or without a top wall according to requirements. In fact, in certain cases it might be expedient to use modules of the first and second type without the top wall and in these cases such "container" modules are closed at the top by the base wall of the module stacked immediately above. Instead, in other cases it might be expedient to use modules of the first and second type fitted with a top wall, for example in order to increase thermal and/or electromagnetic insulation between the various stacked "container" modules, or to increase cosmic radiation shielding for certain internal volumes.

Furthermore, and again conveniently, the modules of the third type could be provided with or without a top wall according to requirements and could be provided with or without a base wall according to requirements.

Conveniently, all the modules of all three types have the same mechanical coupling points at the top and at the bottom to allow the coupling of stacked modules regardless of the type.

Conveniently, the modules of each type are sized in height to conform to respective requirements regarding the respective functions performed, namely:

all modules of the first type have one and the same first height defined such as to guarantee that, for a maximum overall internal dissipation of 80 W, the internal temperature of these modules does not exceed a maximum temperature tolerated by the electronic boards housed in these modules (given the boundary conditions imposed by possible orbits and attitudes);

all modules of the second type have one and the same second height calculated by means of configuration exercises for arrangement and housing of onboard units, carried out on the basis of hardware matrices, in turn dependent on the mission requirements; and all modules of the third type have one and the same third height that represents a compromise between the sizes for managing concentrated loads originating from the interface points and the minimization of the thickness of these modules (in fact, as previously mentioned, modules of the third type can be used to slightly increase the internal volume and/or height of the body of the microsatellite, and/or to couple the body of the microsatellite to a launcher and/or to external appendages and/or to payload items, and/or to increase the radiant surfaces).

Conveniently, the second height is greater than both the first and third heights, and the first height is greater than the third height.

Once the modules are adequately sized with respect to the system-level requirements dictated by the overall "worst case" configuration (in particular in terms of mass, centre of gravity and thermal power), their utilization becomes mainly a question of configuration. In this way, the modular architecture according to the present invention enables reducing the design effort in defining the thermal-mechanical layout of a microsatellite.

In other words, due to the use of the modular architecture according to the present invention, the design of the configuration of a microsatellite (in particular, the definition of the height of the body of the microsatellite and the layout of the internal elements, the external appendages and the payload items) becomes a simple exercise in ordering the stacking of the modules based on the mission requirements and the associated hardware matrices.

In particular, by using the modular architecture according to the present invention, making the body of a microsatellite implies the selection and stacking of standard modules according to the requirements of the mission for which microsatellite is destined, in particular based on mission requirements expressed in terms of:

options regarding the functionality of the satellite bus (for example, the possibility of inserting or not inserting a module containing the propulsion subsystem, or a module with agility actuators, etc.);

matrices of payload units;

external appendages;

overall mass and power of the microsatellite;

flight attitude and orbit; and launch mode.

Furthermore, the electrical interconnections for exchanging data signals and/or power signals (i.e. supplying power) between the various stacked modules are conveniently implemented by means of standard cabling installed externally to the modules and connected to connectors, these also standard, positioned on the modules. In particular, in the stacked modules forming the body of a microsatellite, all the connectors can be arranged along one or more vertical lines, or rather one or more backbones, such that they can be easily disconnected and removed for maintenance/testing operations (as will be described in greater detail hereinafter). For example, all of the connectors configured to allow the passage of data signals could be advantageously placed along one and the same backbone on a lateral side of the body of a microsatellite formed by various stacked modules, while all of the connectors configured to allow the passage of power signals (i.e. supplying power) could be advantageously placed along one and the same backbone arranged on another lateral side of the body of said microsatellite.

With regards to the accessibility of the individual stacked modules forming the body of a microsatellite, it should be noted that every stack of modules can be easily opened at each level for easy access to all the internal elements.

For a better understanding of the present invention, specific aspects and specific characteristics of one or more preferred embodiments of the present invention will be described in detail hereinafter.

Figure 2:
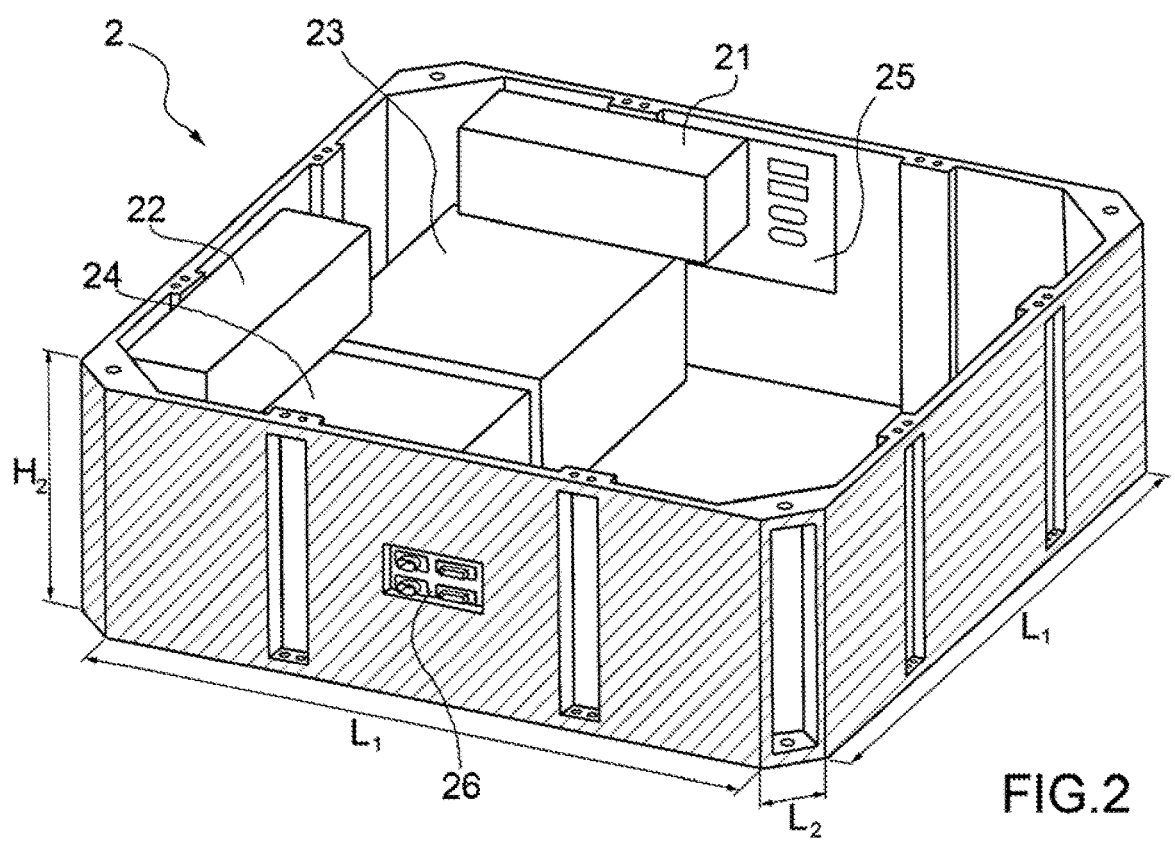
Figure 3:
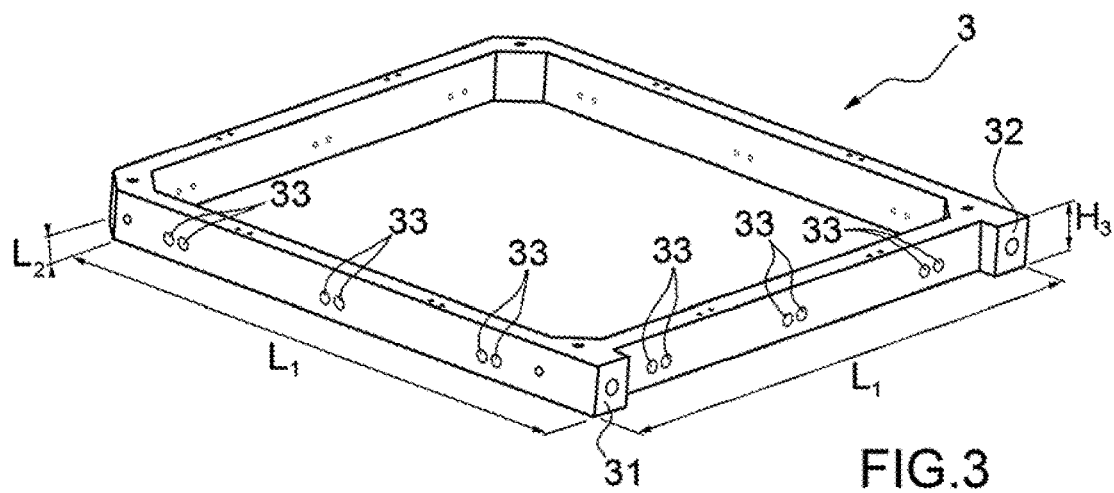

To this end, FIGS. 1, 2 and 3 respectively show a module of the first type (indicated as a whole by reference numeral 1), a module of the second type (indicated as a whole by reference numeral 2) and a module of the third type (indicated as a whole by reference numeral 3), according to a preferred embodiment of the present invention.

In particular, as shown in FIG. 1, the module of the first type 1 has a shape similar to a right prism without the top wall (but, as previously mentioned, it could also be advantageously provided with one), which is hollow inside and has a non-regular octagonal base that has two pairs of opposite sides having an external first predefined length $L_1$ and two pairs of opposite sides having an external second predefined length $L_2$, much smaller than the first predefined length $L_1$. In other words, the module of the first type 1 can be advantageously seen also as a kind of "drawer" structure with corners "rounded off" and a substantially square base (but it could also advantageously be rectangular) with "bevelled" vertices.

Furthermore, the module of the first type 1 has a first predefined height $H_1$ such that to guarantee that, for a maximum overall dissipation of 80 W from the electronic boards housed inside said module of the first type 1, the temperature inside said module of the first type 1 does not exceed a maximum temperature tolerated by the electronic boards housed inside it.

The module of the first type 1 is configured to house up to eight electronic boards, in particular eight PCBs, divided into two planar sets of four boards, one set on top of the other and interconnected via a transversal motherboard so as to drastically reduce the number of cables. With regard to this, FIG. 1 very schematically shows four electronic boards (respectively indicated by reference numerals 11, 12, 13 and 14) connected to a motherboard 15 arranged along a median of the base of the module of the first type 1.

In addition, said module of the first type 1 also comprises connectors 16 and 17 arranged in central areas of two opposite side walls having the above-mentioned first predefined length $L_1$.

Thus, the present invention preferably contemplates abandoning the traditional "boxes" configuration for the electronic units currently used for satellites and instead uses highly integrated electronic boards with a standard format. To this end, modules of the first type, such as that shown in FIG. 1, are configured to house a certain number of standard-format electronic boards, in particular standard-format PCBs, independently of the functions performed by the latter.

In any case, attention should be drawn to the fact that in certain cases it might still be necessary to use electronic components/devices/systems not made in the form of standard-format PCBs, and therefore house these electronic components/devices/systems in one or more modules of the second type. For example, in the case where a specific mission necessarily requires the use of an "off-the-shelf" electronic unit, the redesign and manufacture of which in terms of PCBs is anything but appropriate, then in this case said "off-the-shelf" electronic unit could be advantageously housed in a module of the second type.

More in general, attention should be drawn to the fact that in certain cases modules of the first type might not even be used. For example, in the case where a specific mission exclusively requires the use of "off-the-shelf" electronic units, the redesign and manufacture of which in terms of PCBs is anything but appropriate, then in this situation the body of the microsatellite could be advantageously made by stacking only modules of the second and third types (therefore, without using any module of the first type) and by inserting said "off-the-shelf" electronic units in one or more modules of the second type.

Referring to FIG. 2, the module of the second type 2 has a shape similar to a right prism without the top wall (but, as previously mentioned, it could also be advantageously provided with one), is internally hollow and has a non-regular octagonal base that has two pairs of opposite sides having the external above-mentioned first predefined length $L_1$ and the other two pairs of opposite sides having the external above-mentioned second predefined length $L_2$. In other words, the module of the second type 2 can be also advantageously seen as a kind of "drawer" structure with corners "rounded off" and a substantially square base (but it could also advantageously be rectangular) with "bevelled" vertices.

Furthermore, the module of the second type 2 has a second predefined height $H_2$ that is greater than the first predefined height $H_Z$ of the module of the first type 1 and is such as to:
  allow the housing, inside the module of the second type 2, of those devices and systems of various shapes and sizes, non-customizable and often "off-the-shelf", that are to be installed on board a microsatellite, such as, for example, avionics actuators (reaction wheels, attitude control gyroscopes, etc.), propulsion elements (tanks, pipelines, valves, etc.), batteries, etc.; and
  allow the module of the second type 2 to support the thermal load generated by the devices and systems housed inside it.

In other words, the design of modules of the second type, like that shown in FIG. 2, in particular regarding the height, represents a balance between the housing capacity, in terms of the bulk of the devices and systems to house, and the capacity to support the thermal load generated by these devices and systems.

The module of the second type 2 is configured to house the devices and systems of the above-mentioned type according to two modes that that can be used alternatively or together, namely by:
  fastening the devices and systems to the side walls and/or to the base wall of said module of the second type 2; and/or
  fastening the devices and systems on aluminium frames that are arranged inside said module of the second type 2 and that can be modified according to requirements.

With regard to this, FIG. 2 very schematically shows two devices/systems (respectively indicate by reference numerals 21 and 22) fastened to the side walls of the module of the second type 2 and two devices/systems (respectively indicate by reference numerals 23 and 24) fastened to the base wall of said module of the second type 2.

More in general, in the process of making a microsatellite, it might be appropriate to house all the devices and systems that perform a same or similar function (for example, propulsion, attitude control, electrical power, etc.) in a single module of the second type.

Even if the devices and systems that are housed in the modules of the second type have fewer demands in terms of thermal dissipation with respect to the electronic boards housed in the modules of the first type, the modules of the second type must sustain higher local mechanical loads due to the greater mass present inside them.

Finally, as shown in FIG. 2, the module of the second type 2 also comprises connectors 25 and 26 arranged in central areas of two opposite side walls having the above-mentioned first predefined length $L_1$.

Referring to FIG. 3, the module of the third type 3 has a shape similar to a right prism without the top wall (but, as previously mentioned, it could also be advantageously provided with one), is internally hollow and has a non-regular octagonal base that has:

two pairs of opposite sides having the external above-mentioned first predefined length $L_1$;

two sides having the external above-mentioned second predefined length $L_2$;

and wherein, at the two sides opposite to those having the external above-mentioned second predefined length $L_2$, interface portions 31 and 32 are arranged that protrude outwards, i.e. towards the outside, and which are configured to enable the coupling of the body of a microsatellite to a launcher (as will be described in greater detail hereinafter).

In addition, the module of the third type 3 comprises a plurality of interface points 33 (implemented, for example, in the form of holes of predefined size) that are arranged along the side walls of said module of the third type 3 and are configured to be coupled to external appendages of a microsatellite, such as, for example, solar panels, sensors, antennas, remote sensing devices/systems, etc.

Furthermore, the module of the third type 3 has a third predefined height $H_3$ that is less than the first predefined height $H_1$ of the module of the first type 1 and the second predefined height $H_2$ of the module of the second type 2. In particular, said third predefined height $H_3$ represents an optimal compromise between the need for reducing the overall height of the body of the microsatellite and the needs for handling concentrated mechanical loads deriving from the interface points 33 and the interface means 31 and 32, via which the body of a microsatellite can be coupled, in use, to external appendages and to a launcher, respectively.

As previously described, the module of the third type 3 is designed to carry out a series of functions, namely:

geometrical-structural functions, in particular for the purpose of opportunely defining the height of the body of the microsatellite, and/or spacing out stacked modules, and/or increasing the housing volume of particularly populated modules of the second type, and/or defining, in opportune positions, the interface points with the launcher and/or external appendages (for example solar panels) and/or payload items (such as SAR antennas/devices/systems, optical remote sensing antennas/devices/systems, telecommunications antennas/devices/systems, etc.); and thermal support functions, in particular for the purpose of providing further radiant surfaces for particularly dissipative items placed inside a given module of the first or second type.

Figure 4:
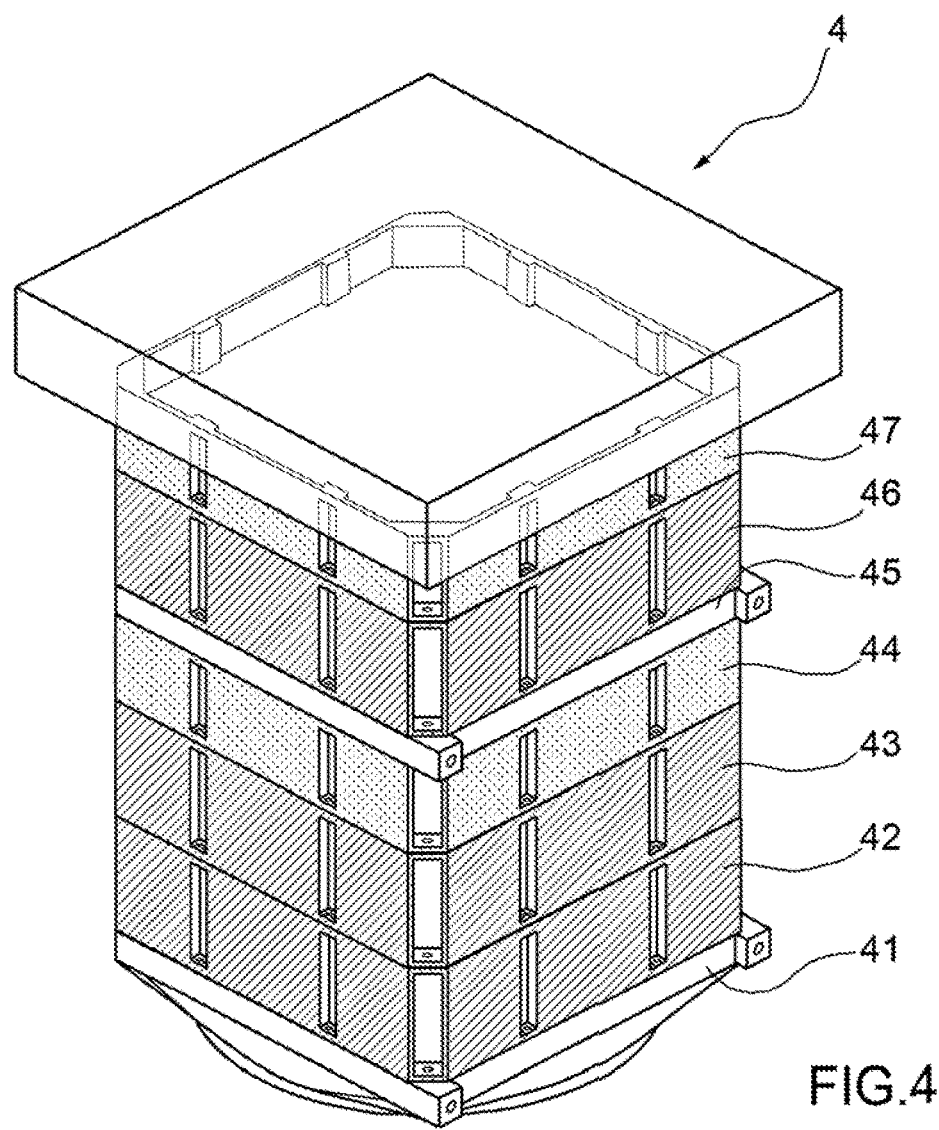
FIG. 4 shows a body of a microsatellite according to an embodiment of the present invention.

Furthermore, FIG. 4 shows a body of a microsatellite (indicated as a whole by reference numeral 4) according to an embodiment of the present invention. In particular, as shown in FIG. 4, the body of the microsatellite 4 includes a plurality of modules of the first, second and third type stacked one on top the other. In detail, said stacked modules forming the body of the microsatellite 4 include, from the bottom upwards:

a first module of the third type 41;

a first module of the second type 42 arranged on the first module of the third type 41;

a second module of the second type 43 arranged on the first module of the second type 42;

a first module of the first type 44 arranged on the second module of the second type 43;

a second module of the third type 45 arranged on the first module of the first type 44;

a third module of the second type 46 arranged on the second module of the third type 45; and a second module of the first type 47 arranged on the third module of the second type 46.

Figure 5:
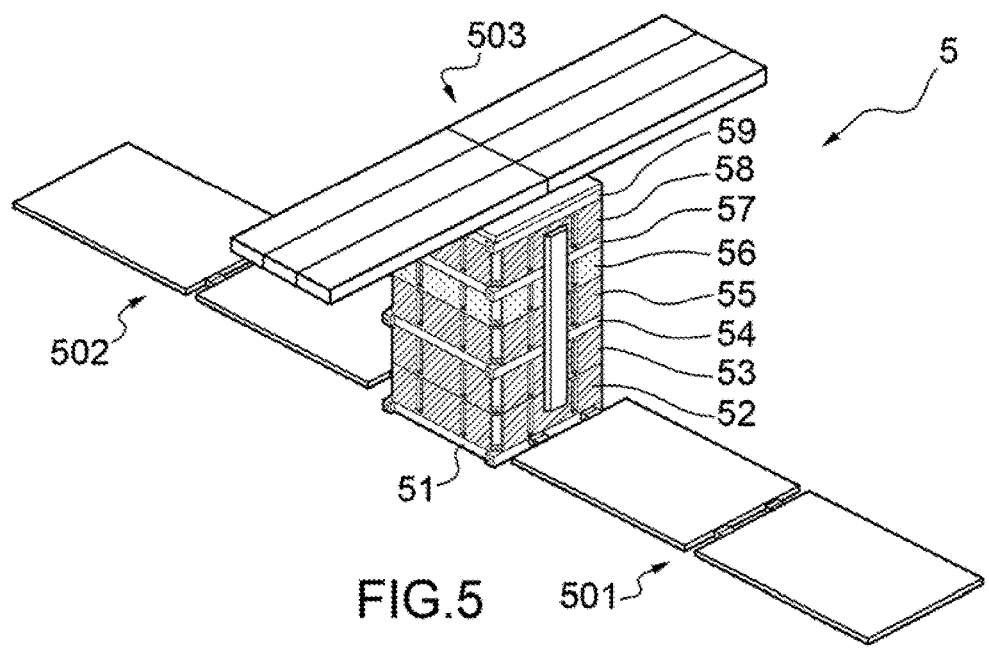
FIGS. 5, 6 and 7 respectively show a microsatellite for SAR remote sensing, a microsatellite for optical remote sensing and a microsatellite for telecommunications, according to three embodiments of the present invention.
Figure 6:
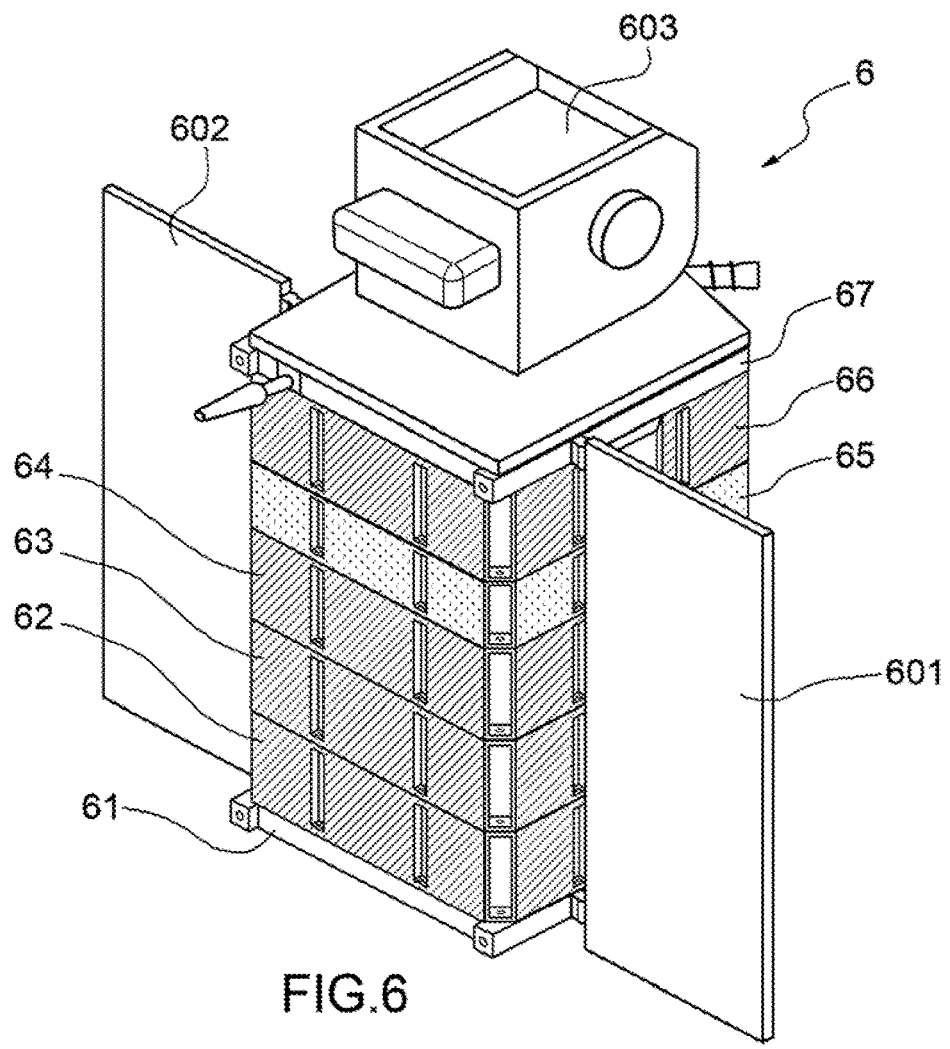
Figure 7:
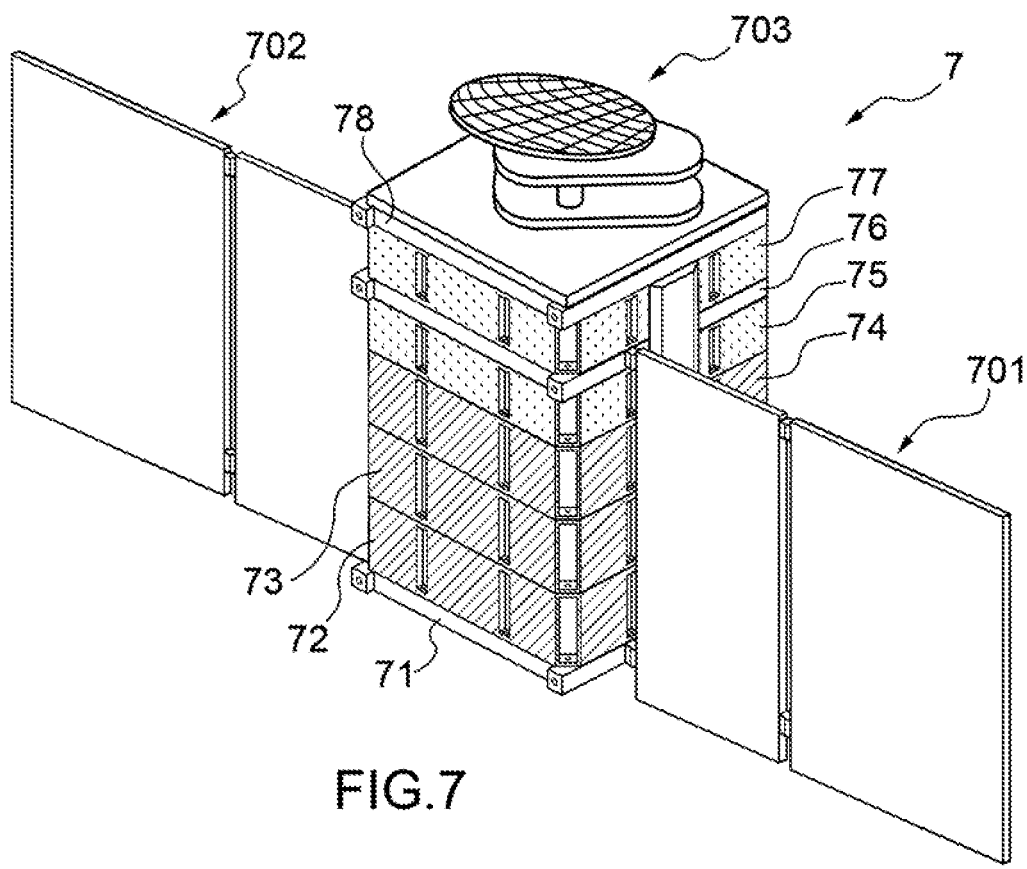

Furthermore, FIGS. 5, 6 and 7 show three microsatellites, indicated by reference numerals 5, 6 and 7, respectively, according to embodiments of the present invention.

In particular, the microsatellite 5 shown in FIG. 5 is a microsatellite for SAR-type remote sensing applications, the body of which includes a plurality of modules of the first, second and third type stacked one on top the other.

In detail, said stacked modules forming the body of the microsatellite 5 include, from the bottom upwards:

a first module of the third type 51;

a first module of the second type 52 arranged on the first module of the third type 51;

a second module of the second type 53 arranged on the first module of the second type 52;

a second module of the third type 54 arranged on the second module of the second type 53;

a third module of the second type 55 arranged on the second module of the third type 54;

a module of the first type 56 arranged on the third module of the second type 55;

a third module of the third type 57 arranged on the module of the first type 56;

a fourth module of the second type 58 arranged on the third module of the third type 57; and a fourth module of the third type 59 arranged on the fourth module of the second type 58.

In addition, the microsatellite 5 also includes two groups of solar panels 501 and 502 coupled to the first module of the third type 51 and a SAR system 503 installed on the fourth module of the third type 59.

Referring to FIG. 6, the microsatellite 6 is a microsatellite for optical remote sensing applications, the body of which includes a plurality of modules of the first, second and third type stacked one on top the other.

In detail, said stacked modules forming the body of the microsatellite 6 include, from the bottom upwards:

a first module of the third type 61;

a first module of the second type 62 arranged on the first module of the third type 61;

a second module of the second type 63 arranged on the first module of the second type 62;

a third module of the second type 64 arranged on the second module of the second type 63;

a module of the first type 65 arranged on the third module of the second type 64;

a fourth module of the second type 66 arranged on the module of the first type 65; and a second module of the third type 67 arranged on the fourth module of the second type 66.

Furthermore, the microsatellite 6 also includes two solar panels 601 and 602 coupled to the first module of the third type 61 and to the second module of the third type 67, and an optical remote sensing system 603 installed on the second module of the third type 67.

Referring to FIG. 7, the microsatellite 7 is a microsatellite for telecommunications, the body of which includes a plurality of modules of the first, second and third type stacked one on top the other.

In detail, said stacked modules forming the body of the microsatellite 7 include, from the bottom upwards:

a first module of the third type 71;

a first module of the second type 72 arranged on the first module of the third type 71;

a second module of the second type 73 arranged on the first module of the second type 72;

a third module of the second type 74 arranged on the second module of the second type 73;

a first module of the first type 75 arranged on the third module of the second type 74;

a second module of the third type 76 arranged on the first module of the first type 75;

a second module of the first type 77 arranged on the second module of the third type 76; and a third module of the third type 78 arranged on the second module of the first type 77.

Furthermore, the microsatellite 7 also includes two groups of solar panels 701 and 702 coupled to the first module of the third type 71 and to the second module of the third type 76, and a telecommunications system 703 installed on the third module of the third type 78.

The modular architecture according to the present invention assures a dual launching capability for the constructed microsatellites; in particular, it enables making microsatellites that can be launched in orbit via both the main launching methods, namely the so-called "dispenser" and "piggyback" modes. In particular, it is thanks to the opportune arrangement of one or more modules of the third type that a microsatellite can be opportunely configured to be coupled to a launcher via:

a typical ring-shaped launch vehicle adapter (LVA) (in this case a module of the third type is placed in the lowest position of the body of the microsatellite and is coupled to the ring-shaped LVA via a specific end connection structure); or a dispenser interface (in this case, the interfaces with the dispenser are arranged in opportune positions of the body of the microsatellite by opportunely positioning two or more modules of the third type in the stacking sequence).

Figure 8:
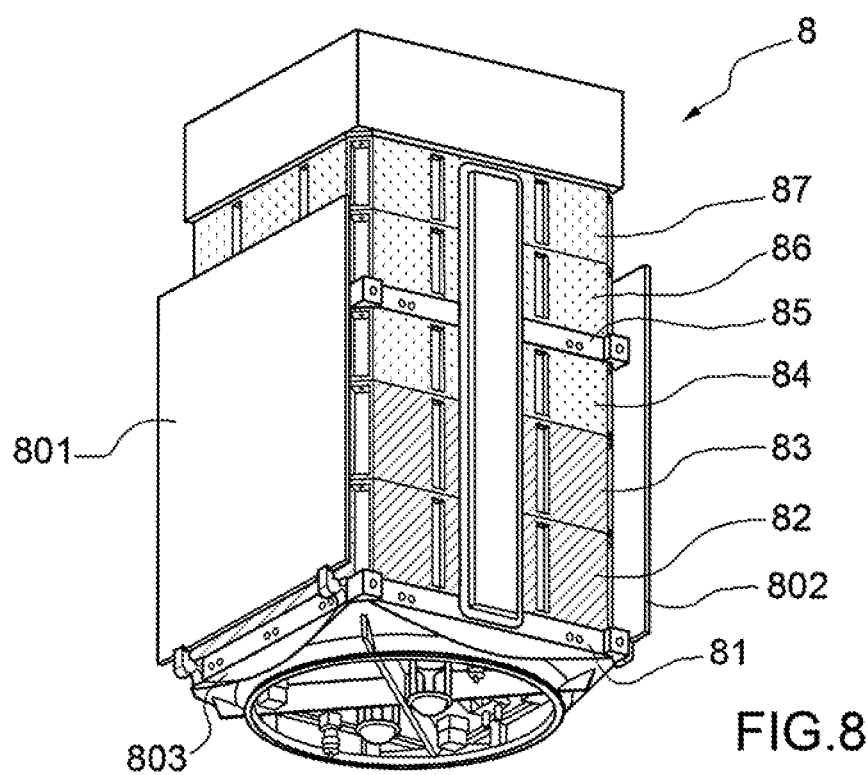
FIGS. 8 and 9 show one and the same microsatellite configured to be coupled to a launch vehicle by means, respectively, of a ring-shaped launch vehicle adapter and of a dispenser interface, according to two embodiments of the present invention.
Figure 9:
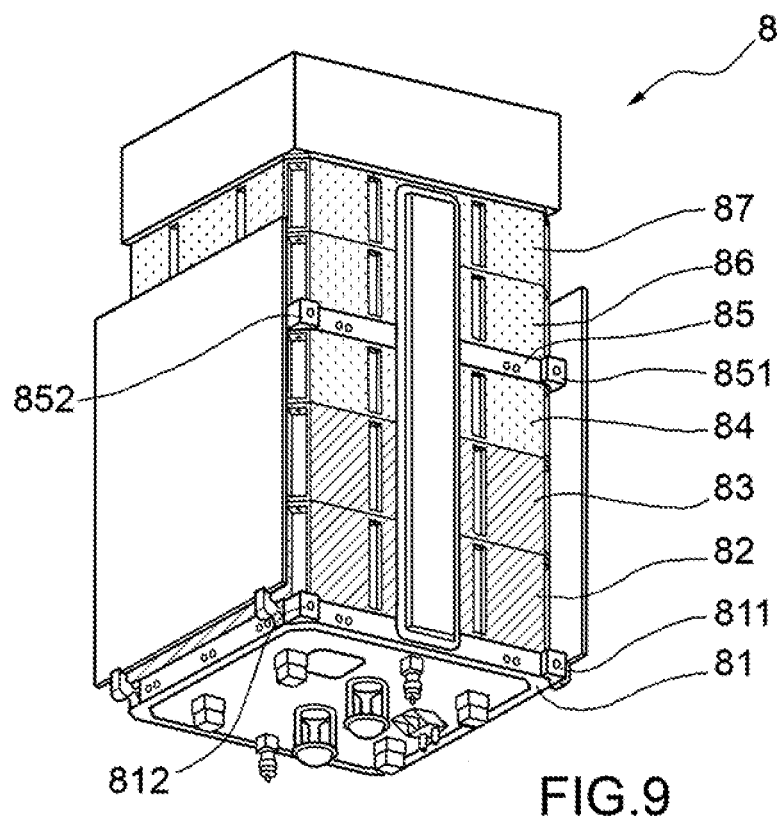

With regard to this, FIGS. 8 and 9 show one and the same microsatellite (indicated as a whole by reference numeral 8) configured to be coupled to a launcher via a ring-shaped LVA and a dispenser interface, respectively, according to two embodiments of the present invention.

In particular, as shown in both FIGS. 8 and 9, the body of the microsatellite 8 includes, from the bottom upwards:

a first module of the third type 81;

a first module of the second type 82 arranged on the first module of the third type 81;

a second module of the second type 83 arranged on the first module of the second type 82;

a first module of the first type 84 arranged on the second module of the second type 83;

a second module of the third type 85 arranged on the first module of the first type 84;

a second module of the first type 86 arranged on the second module of the third type 85; and a third module of the first type 87 arranged on the second module of the first type 86.

Furthermore, the microsatellite 8 also includes two solar panels 801 and 802 coupled to the first module of the third type 81 and folded along the body of said microsatellite 8 (i.e. in the typical configuration adopted for launching a satellite).

In the example shown in FIG. 8 the microsatellite 8 includes an interface structure 803 that is arranged beneath the first module of the third type 81 and that is configured to be coupled to an LVA ring (not shown in FIG. 8), while in the example in FIG. 9 the first module of the third type 81 and the second module of the third type 85 each comprise a respective pair of laterally projecting interface portions (indicated by reference numerals 811 and 812 and reference numerals 851 and 852, respectively) and configured to be coupled to specially provided dispenser interface means.

The above-mentioned dual interfacing and therefore dual launching capability of microsatellites constructed on the basis of the modular architecture according to the present invention ensures broad launching flexibility. In fact, a microsatellite constructed on the basis of the modular architecture according to the present invention can be launched:

as primary payload (using a ring-shaped LVA);

as secondary payload (in piggyback mode and/or using a ring-shaped LVA); and also as part of a multiple launch via dispenser.

Thus, due to this flexibility, the present invention enables:

in urgent cases, seeking and then using the first available launch solution; and evaluating a wide range of launch solutions in order to select the solution of least cost and/or performance most suited to the particular mission.

Furthermore, thanks to the present invention, it is possible to perform a multiple launch of a plurality of microsatellites (for example, in the case of a constellation) in a single action.

Figure 10:
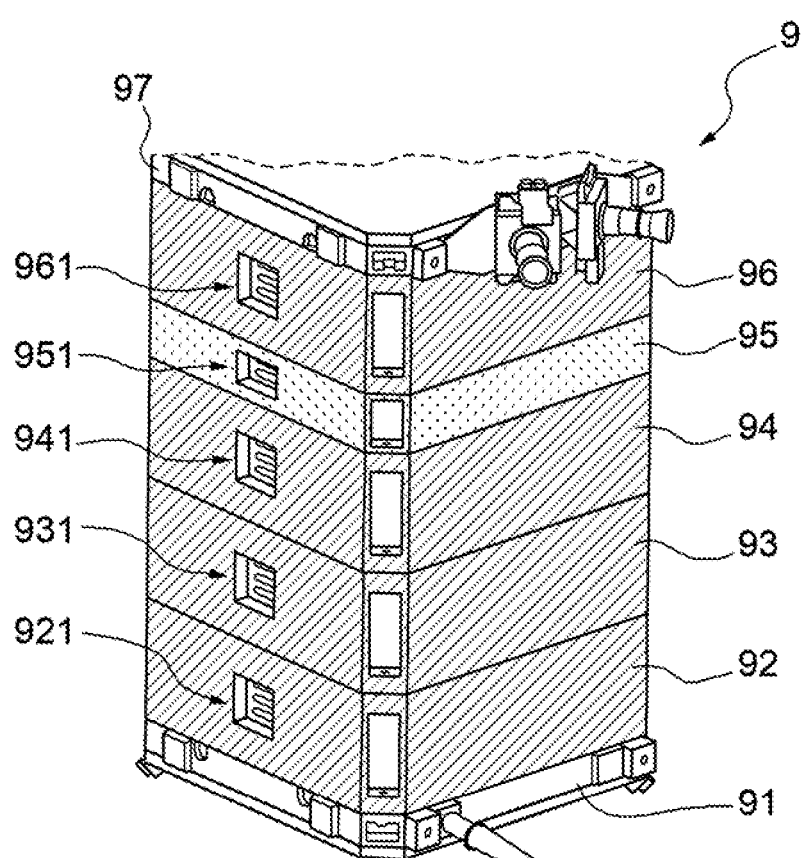
FIGS. 10 and 11 show the body of one and the same microsatellite according to an embodiment of the present invention.
Figure 11:
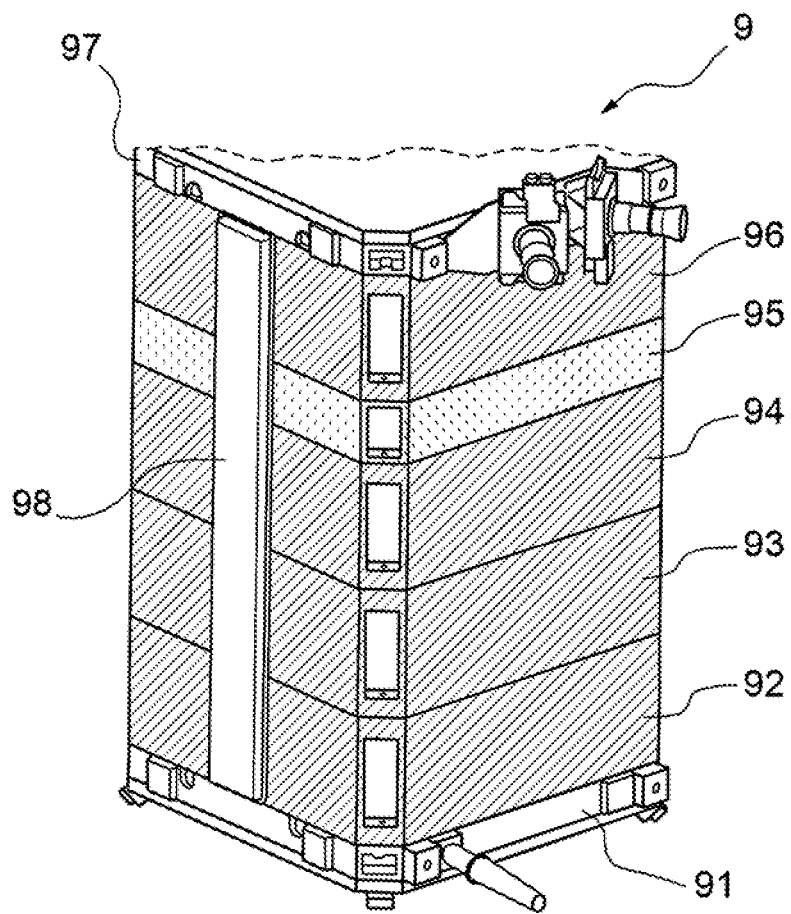

A further aspect of the present invention relates to the cabling of the various stacked modules. With regard to this, FIGS. 10 and 11 show the body of one and the same microsatellite 9 according to an embodiment of the present invention, the body of said microsatellite 9 includes, from the bottom upwards:

a first module of the third type 91;

a first module of the second type 92 arranged on the first module of the third type 91 and comprising connectors 921 arranged in a central area of a respective side wall;

a second module of the second type 93 arranged on the first module of the second type 92 and comprising connectors 931 arranged in a central area of a respective side wall;

a third module of the second type 94 arranged on the second module of the second type 93 and comprising connectors 941 arranged in a central area of a respective side wall;

a module of the first type 95 arranged on the third module of the second type 94 and comprising connectors 951 arranged in a central area of a respective side wall;

a fourth module of the second type 96 arranged on the module of the first type 95 and comprising connectors 961 arranged in a central area of a respective side wall; and a second module of the third type 97 arranged on the fourth module of the second type 96.

As shown in FIG. 10, due to the standardized arrangement of the connectors 921, 931, 941, 951 and 961 on the respective modules 91, 93, 94, 95 and 96 (i.e. in a same predefined central area of a respective side wall of these modules) and due to the opportune stacking of these modules, said connectors 921, 931, 941, 951 and 961 all become arranged along one and the same vertical line, or backbone, which then, as shown in FIG. 11, is duly covered by a dedicated aluminium plate 98.

In this way, the wirings inside each module are run to the respective connectors of that module, after which the data signals and power signals can travel from module to module along the above-mentioned backbone external to the modules.

Thanks to this characteristic, stacking flexibility and adaptability is guaranteed so as to facilitate, if necessary, reorganization of the stacking order.

The innumerable technical advantages of the present invention are immediately evident from the foregoing description.

First of all, it is important to underline that, due to the utilization of a limited number of types of module, which in addition are also standard, the modular architecture according to the present invention enables:

reducing the design, manufacturing, integration and testing efforts for a microsatellite and, in consequence, the associated construction times and costs;

achieving high levels of standardization at the assembly level; and using a limited number of production tools and processes and standardizing and optimizing these tools and processes, in this way rendering solutions based on the modular architecture according to the present invention extremely inexpensive and rapid to implement.

Furthermore, thanks to the present invention it is possible to perform preliminary bench testing and environmental testing on individual modules and on assemblies, even partial ones, of modules containing the devices, systems and electronic boards necessary for a given mission, in this way reducing the number of tests to carry out at the system level once the microsatellite is integrated. Naturally, all of this results in a further reduction in the implementation times for a microsatellite. In other words, thanks to the present invention, integration and testing operations can be performed in parallel on individual modules and on module assemblies, even partial ones, so as to provide pre-validation of these modules and these module assemblies, in this way obtaining "off-the-shelf" modules and module assemblies that make system-level integration and testing operations much quicker.

Furthermore, the modular architecture according to the present invention is highly flexible and adaptable, enabling:

making microsatellites usable for a wide variety of missions; and using different launch modes.

Summarizing, the modular architecture according to the present invention ultimately enables achieving an extremely large number of advantages in the construction of microsatellites, in terms of:

reduction in manufacturing times and costs;

mission flexibility; and launching flexibility.

In conclusion, it is clear that various modifications can be applied to the present invention without departing from the scope of the invention as defined in the appended claims.

The invention claimed is:

1. A method for making a microsatellite, comprising:
  (i) providing a plurality of modules, wherein the plurality of modules comprise:
    optionally, one or more modules of a first type housing electronic boards of a microsatellite;
    one or more modules of a second type housing devices and systems of a microsatellite; and
    one or more modules of a third type, which
      comprise first interface means configured to be coupled to a launch vehicle,
      comprise second interface means configured to be coupled to external appendages of a microsatellite, and
      are designed to cause a body of a microsatellite to have a predefined height;
  wherein all the modules of the first, second and third types are configured to be stacked regardless of the type; and
  (ii) assembling the provided modules of different types to define a microsatellite body, wherein the assembled modules include at least one module of the second type and at least one module of the third type, and wherein the assembled microsatellite body does not comprise any modules that include components that support operation or control of the microsatellite other than one or more modules of the second type, one or more modules of the third type and, optionally, one or more modules of the first type.

2. The method of claim 1, wherein said stacked modules include at least one module of the first type.

3. The method of claim 2, further comprising performing the following operations:

providing a stacking order of said modules, wherein each module of the third type is inserted in said stacking order to carry out at least one of the following functions:

spacing apart two modules intended, according to said stacking order, to be stacked immediately above and below said module of the third type, increasing a housing volume of a second module intended, according to said stacking order, to be stacked immediately below said module of the third type, increasing disposal of internal heat of a first or second module intended, according to said stacking order, to be stacked immediately below said module of the third type, providing interface points for coupling the body of the microsatellite to external appendages and/or to a launch vehicle; and making the body of the microsatellite by stacking said modules according to said stacking order.

4. The method according to claim 1, further comprising coupling the body of the microsatellite to external appendages by coupling the latter to the second interface means of at least one stacked module of the third type.

5. The method of claim 4, wherein said external appendages coupled to the body of the microsatellite comprise at least one of the following elements: one or more solar panels, one or more sensors, one or more antennas, and one or more remote sensing systems.

6. The method according to claim 1, wherein the body of the microsatellite includes at least two modules of the third type arranged in predefined positions; said method further comprising coupling the first interface means of said at least two modules of the third type arranged in said predefined positions to a dispenser interface designed to couple said microsatellite to a launch vehicle operating in dispenser mode.

7. The method according to claim 1, wherein the body of the microsatellite terminates at the bottom with a module of the third type, which is coupled at the bottom to an interface configured to be coupled to a ring-shaped adapter for a launch vehicle.

8. The method according to claim 1, further comprising installing on the body of the micro satellite at least one of a synthetic aperture radar system, an optical remote sensing system and a telecommunications system.

9. The method according to claim 1, wherein all the modules of the first, second and third types have one and the same base size, one and the same base shape and same mechanical coupling points, thereby being configured to be stacked regardless of the type.

10. The method according to claim 1, wherein all the modules of the first type have one and the same first height ($H_1$), all the modules of the second type have one and the same second height ($H_2$) and all the modules of the third type have one and the same third height ($H_3$); and wherein the first height ($H_1$) is greater than the third height ($H_3$) and the second height ($H_2$) is greater than the first height ($H_1$).

11. The method of claim 10, wherein said first height ($H_1$) is selected so as to guarantee that internal temperature of the modules of the first type does not exceed a predefined maximum temperature.

12. A modular microsatellite, comprising a plurality of modules, wherein the plurality of modules comprise:
optionally, one or more modules of a first type housing electronic boards of the modular microsatellite;
one or more modules of a second type housing devices and systems of the modular microsatellite; and
one or more modules of a third type, which
comprise first interface means configured to be coupled to a launch vehicle,
comprise second interface means configured to be coupled to external appendages of the modular microsatellite, and
are designed to cause a body of the modular microsatellite to have a predefined height;
wherein all the modules of the first, second and third types are configured to be stacked regardless of the type to make the modular microsatellite; and
wherein the assembled modular microsatellite does not comprise any modules that include components that support operation or control of the modular microsatellite other than one or more modules of the second type, one or more modules of the third type and, optionally, one or more modules of the first type.

13. The modular microsatellite of claim 12, wherein each module of the third type is designed to carry out at least one of the following functions:
causing the modular microsatellite to have a predefined height;
spacing apart two modules stacked immediately above and below said module of the third type;
increasing a housing volume of a module of the second type stacked immediately below said module of the third type;
increasing disposal of internal heat of a module of the first or second type-stacked immediately below said module of the third type;
providing interface points for coupling the modular microsatellite to external appendages and/or to a launch vehicle.

14. The modular microsatellite according to claim 12, wherein said second interface means is configured to be coupled to at least one of the following elements:
one or more solar panels, one or more sensors, one or more antennas, and one or more remote sensing systems.

15. The modular microsatellite according to claim 12, wherein said first interface means is further configured to couple the modular microsatellite to a launch vehicle operating in dispenser mode.

16. The modular microsatellite according to claim 12, wherein each module of the third type is configured to be coupled at the bottom to an interface configured to be coupled to a ring-shaped adapter for a launch vehicle.

17. The modular microsatellite according to claim 12, wherein all the modules of the first, second and third types have one and the same base size, one and the same base shape and same mechanical coupling points, thereby being configured to be stacked regardless of the type.

18. The modular microsatellite according to claim 12, wherein all the modules of the first type have one and the same first height ($H_1$), all the modules of the second type have one and the same second height ($H_2$) and all the modules of the third type have one and the same third height ($H_3$); and wherein the first height ($H_1$) is greater than the third height ($H_3$) and the second height ($H_2$) is greater than the first height ($H_1$).

19. The modular microsatellite of claim 18, wherein said first height ($H_1$) is selected so as to guarantee that internal temperature of the modules of the first type does not exceed a predefined maximum temperature.

20. A microsatellite made by carrying out the method claimed in claim 1.

* * * * *